(12) United States Patent
Xing

(10) Patent No.: US 10,354,095 B2
(45) Date of Patent: Jul. 16, 2019

(54) METHODS AND APPARATUS TO INITIALIZE ENCLAVES ON TARGET PROCESSORS

(71) Applicant: Intel Corporation, Santa Clara, CA (US)

(72) Inventor: Bin Xing, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 571 days.

(21) Appl. No.: 15/087,029

(22) Filed: Mar. 31, 2016

(65) Prior Publication Data

US 2017/0286721 A1    Oct. 5, 2017

(51) Int. Cl.
    *G06F 12/00*     (2006.01)
    *G06F 21/71*     (2013.01)
    *G06F 9/445*     (2018.01)

(52) U.S. Cl.
    CPC .......... *G06F 21/71* (2013.01); *G06F 9/44505* (2013.01)

(58) Field of Classification Search
    CPC ....... G06F 9/44; G06F 12/084; G06F 12/1483
    See application file for complete search history.

(56) References Cited

U.S. PATENT DOCUMENTS

| | | |
|---|---|---|
| 2013/0232344 A1 | 9/2013 | Johnson et al. |
| 2014/0189326 A1 | 7/2014 | Leslie et al. |
| 2016/0054945 A1 | 2/2016 | Xing |
| 2016/0085695 A1 | 3/2016 | Leslie-Hurd et al. |

FOREIGN PATENT DOCUMENTS

KR      20140118862      10/2014

OTHER PUBLICATIONS

International Searching Authority, "Search Report", issued in connection with PCT Patent application No. PCT/US2017/018683, dated Jun. 9, 2017, 5 pages.
International Searching Authority, "Written Opinion", issued in connection with PCT Patent application No. PCT/US2017/018683, dated Jun. 9, 2017, 7 pages.
Hoekstra, "Intel® SGX for Dummies (Intel® SGX Design Objectives)," Intel Corporation, Sep. 26, 2013, modified on Nov. 30, 2015, retrieved from <http://software.intel.com/en-us/blogs/2013/09/26/protecting-application-secrets-with-intel-sgx>, retrieved on Feb. 15, 2016, 2 pages.

(Continued)

*Primary Examiner* — Gurtej Bansal
(74) *Attorney, Agent, or Firm* — Hanley, Flight & Zimmerman, LLC

(57) ABSTRACT

Methods, apparatus, systems and articles of manufacture are disclosed to initialize enclaves on target processors. An example apparatus includes an image file retriever to retrieve configuration parameters associated with an enclave file, and an address space manager to calculate a minimum virtual address space value for an enclave image layout based on the configuration parameters, and generate an optimized enclave image layout to allow enclave image execution on unknown target processor types by multiplying the minimum address space value with a virtual address factor to determine an optimized virtual address space value for the optimized enclave image layout.

20 Claims, 8 Drawing Sheets

(56) References Cited

OTHER PUBLICATIONS

Hoekstra, "Intel® SGX for Dummies—Part 2," Intel Corporation, Jun. 2, 2014, retrieved from <http://software.intel.com/en-us/blogs/2014/06/02/intel-sgx-for-dummies-part-2>, retrieved on Feb. 15, 2016, 2 pages.
Hoekstra, "Intel® SGX for Dummies—Part 3," Intel Corporation, Sep. 1, 2014, retrieved from <http://software.intel.com/en-us/blogs/2014/09/01/intel-sgx-for-dummies-part-3>, retrieved on Feb. 15, 2016, 2 pages.
Anonymous, "A Primer on Intel® Software Guard Extensions (Intel® SGX)," Intel Corporation, retrieved on Mar. 4, 2016, 1 page.
Anonymous, "Intel® Software Guard Extensions Programming Reference," Intel Corporation, Oct. 2014, Reference No. 329298-002US, 186 pages.
Anonymous, "Intel® Software Guard Extensions (Intel® SGX)," Intel Corporation, Jun. 2015, Reference No. 332680-002, Revision No. 1.1, 238 pages.
Rutkowska, "The Invisible Things Lab's Blog: Thoughts on Intel's Upcoming Software Guard Extensions (Part 1)," The Invisible Things Lab's Blog, Aug. 30, 2013, retrieved from <http://theinvisiblethings.blogspot.com/2013/08/thoughts-on-intels-upcoming-software.html>, retrieved on Feb. 16, 2016, 11 pages.

METHODS AND APPARATUS TO INITIALIZE ENCLAVES ON TARGET PROCESSORS

FIELD OF THE DISCLOSURE

This disclosure relates generally to computer platform application security, and, more particularly, to methods and apparatus to initialize enclaves on target processors.

BACKGROUND

In recent years, security enhancements to processors have emerged to allow applications to create protected regions of address space, which are referred to herein as enclaves. Particular processor instruction sets (e.g., processor microcode) allow implementation of enclaves that prohibit access to enclave memory areas by code outside of the enclave. Example processor instruction sets to facilitate application enclaves of a platform are known as SGX (Software Guard Extension) instruction sets. Some example SGX instruction sets permit enclave dynamic memory management that allow adding or removing cache pages to an enclave as needed during runtime.

DETAILED DESCRIPTION

Figure 1A:
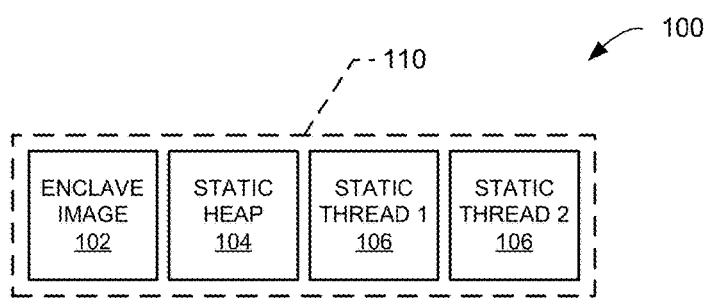
FIG. 1A is an example enclave memory layout conforming to requirements of a static software guard extension processor.

Early generation SGX (Software Guard Extension) instruction sets permitted the generation of secure enclaves (referred to herein as "enclaves") that establish a secure computing environment for software applications and/or data. When the enclave (e.g., an enclave file) is initialized on a computing platform (e.g., an enclave image), it operates in a portion of virtual memory (trusted memory) that is inaccessible by external applications and/or the operating system (OS). Functions performed by the enclave image may be invoked by an untrusted application (e.g., the OS) and one or more trusted functions of the enclave image may be invoked so that the trusted function can access enclave data in plaintext, while functions external to the enclave image are denied such plaintext access.

Generally speaking, SGX enclaves include a build-time phase, a load-time phase, and a runtime phase. During the example build-time phase, source code (e.g., developed by an independent software vendor (ISV)) is supplied to a compiler and linker, which may utilize one or more signing tools of an SGX software development kit (SDK) to generate an enclave executable file. Additionally, the example source code includes configuration information that has one or more requirements for the enclave, such as component requirements (e.g., a size of heaps, a size of stacks, a number of threads, etc). The one or more signing tools of the SGX SDK determine a virtual size of the enclave and addresses of the one or more components. Further, during the build-time compiling/linking, address information and/or size information (of page types) are written to a corresponding executable file to be used during the load-time phase. In some examples, address information, size information and/or page information generated by the one or more signing tools of the SGX SDK are referred to as metadata.

During the example load-time phase, the enclave executable file is loaded into an enclave page cache (EPC), which results in an enclave image. As described in further detail below, the example EPC is a secure memory structure that can be accessed using instructinos from an SGX instruction set associated with a processor developed to handle enclaves. During this load-time phase, corresponding code and/or data of the enclave file is loaded along with one or more static components identified by the metadata created by the one or more signing tools of the SGX SDK. The loading activity may include one or more SGX instructions such as ECREATE, EADD (adds pages needed by memory structures specified by the metadata) and/or EEXTEND. Additionally, each enclave file includes an associated digital signature to be verified to a subsequent measurement. The measurement occurs in response to a particular SGX instruction named EINIT. After the EINIT instruction is invoked, other instructions listed above cannot be used any more, and a measurement of the enclave occurs that can be compared to the digital signature, thereby allowing a (remote) party to authenticate the enclave with an expected measurement value. Remote parties may include the operating system (OS) and/or applications and/or services running on remote platform(s).

In the event of a successful measurement, the runtime phase may proceed, in which the enclave initialization code (e.g., trusted code running inside the enclave) determines whether to use static or dynamic heap/stacks. Prior to the EINIT instruction, the enclave cannot run. However, untrusted runtime libraries and/or drivers must collaborate with page allocation for any interaction to preserve the secure nature of enclave operation(s).

During the runtime phase, the enclave image operates in trusted memory and includes enclave data and/or enclave code having any number of threads (e.g., a thread control structure (TCS)). As described above, in the event a remote party (e.g., an application and/or OS) wishes to access one or more services of the enclave image, an integrity verification occurs (measurement) prior to the runtime phase to ensure that the enclave image has not been compromised. The measurement includes parameters of the enclave image such as, but not limited to, a size of virtual memory required for operation (e.g., an enclave virtual size), a size of a static heap, a number of threads, a size of each thread (including thread stack sizes, thread local storage, thread data, etc.), or a size of a dynamic heap (e.g., for enclave images that support dynamic memory management). While an independent software vendor (ISV) develops and/or otherwise writes code for an enclave file, the measurement occurs after the enclave file is loaded into virtual memory as an enclave image. A enclave in memory includes at least a memory-mapped executable file developed by the ISV, one or more stacks (e.g., multiple stacks for multi-threaded applications), and a heap. The corresponding enclave image in memory includes a loaded version of these components in which those components are aligned and padded. During a loading phase of the enclave file, virtual memory is allocated (e.g., pages), and static components are allocated (e.g., a static heap, static thread(s)). In the event that the SGX instruction set of the processor includes dynamic memory management capabilities, dynamic components may be used (e.g., a dynamic heap, dynamic thread(s)), etc.). As described in further detail below, dynamic components do not exist until runtime.

In the illustrated example of FIG. 1A, a first enclave memory layout 100 includes an enclave image 102, a static heap 104, a first static thread 106, and a second static thread 108. In particular, the first enclave memory layout 100 conforms to requirements of a first SGX instruction set of a corresponding processor that is capable of handling static components only (e.g., a "static SGX processor"), in which the particular arrangement of components within the first enclave memory layout 100 cannot change during runtime. In some examples, the static SGX processor refers to relatively early generations of SGX processors named "SGX 1.0". As discussed in further detail below, other (e.g., more recent generations) SGX instruction sets (e.g., microcode of more recent SGX processors) are capable of handling both static components, as well as dynamic components that may be invoked and/or otherwise change during runtime. In some examples, relatively recent generations of SGX processors (e.g., "dynamic SGX processors") are named "SGX 2.0". The example first enclave memory layout 100 is allocated to virtual memory having a first virtual size 110 represented by a dashed line. As such, when the example first enclave memory layout 100 is loaded, a corresponding measurement will be based on the example first virtual size 110 of allocated virtual memory, the example enclave image 102, the example static heap 104, the example first static thread 106, and the example second static thread 108.

Figure 1B:
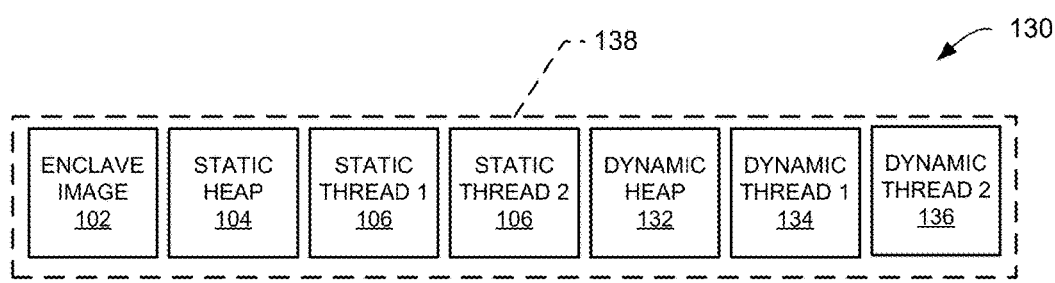
FIG. 1B is an example enclave memory layout conforming to requirements of a dynamic software guard extension processor.

In the illustrated example of FIG. 1B, a second enclave memory layout 130 includes the enclave image 102, the static heap 104, the first static thread 106, and the second static thread 108. However, because the example second enclave memory layout 130 is targeted for a second SGX processor having a second SGX instruction set that is capable of handling dynamic components (e.g., a "dynamic SGX processor," or "SGX 2.0"), the example second enclave memory layout 130 further includes, during runtime, an example dynamic heap 132, an example first dynamic thread 134, and an example second dynamic thread 136. Each of the first dynamic thread 134 and the example second dynamic thread 136 may include corresponding thread local storage (TLS) components, thread data (TD) components, state save areas (SSAs) and/or stacks. Additionally, to accommodate for the dynamic components the example second enclave memory layout 130 is allocated to virtual memory having a second virtual size 138 represented by a dashed line. As such, when the example second enclave memory layout 130 is loaded, a corresponding measurement will be based on the example second virtual size 138 of allocated virtual memory, the example enclave image 102, the example static heap 104, the example first static thread 106, and the example second static thread 108, but the example dynamic heap 132, the example first dynamic thread 134, and the example second dynamic thread 136 will not be part of that measurement.

While the same example enclave image 102 is used for the example first enclave memory layout 100 and the example second enclave memory layout 130, the measurements between these two layouts will be different. In particular, when comparing the example first enclave memory layout 100 and the example second enclave memory layout 130, two different measurements will result due to the difference in size of the example allocated first virtual size 110 and the example allocated second virtual size 138 of the virtual memory. As such, the ISV is burdened with a responsibility to manage two separate memory layouts depending on which target processor type will execute the enclave. In some examples, the ISV may require adjustments to its attestation infrastructure to accommodate for different measurements that may occur depending on different types of SGX capabilities (e.g., SGX processors with only static component capabilities, SGX processors with static and dynamic component capabilities).

Example methods, apparatus, systems and/or articles of manufacture disclosed herein facilitate processor agnostic enclave image layout loading, such as enclave image 102 loading on either static memory management SGX processors (static SGX processors) or dynamic memory management SGX processor (dynamic SGX processors) without further coding efforts by the ISVs. As described above, ISVs are typically responsible for coding and/or otherwise designing enclave files to be executed in secure virtual memory as an enclave image, such as the example enclave image 102 of FIGS. 1A and/or 1B. Examples disclosed herein permit an ISV to deploy an enclave image file to a target platform when the target processor type (e.g., static SGX processor, dynamic SGX processor) is unknown, thereby removing ISV concern for specifically tailoring the enclave file for one or more memory management instructions that are specific to a target SGX processor. Additionally, examples disclosed herein determine and/or otherwise detect a type of the target SGX processor after the loading phase is complete to inform the enclave memory layout in virtual memory of which memory management routines are available during runtime (e.g., static component memory management or dynamic component memory management).

Figure 2:
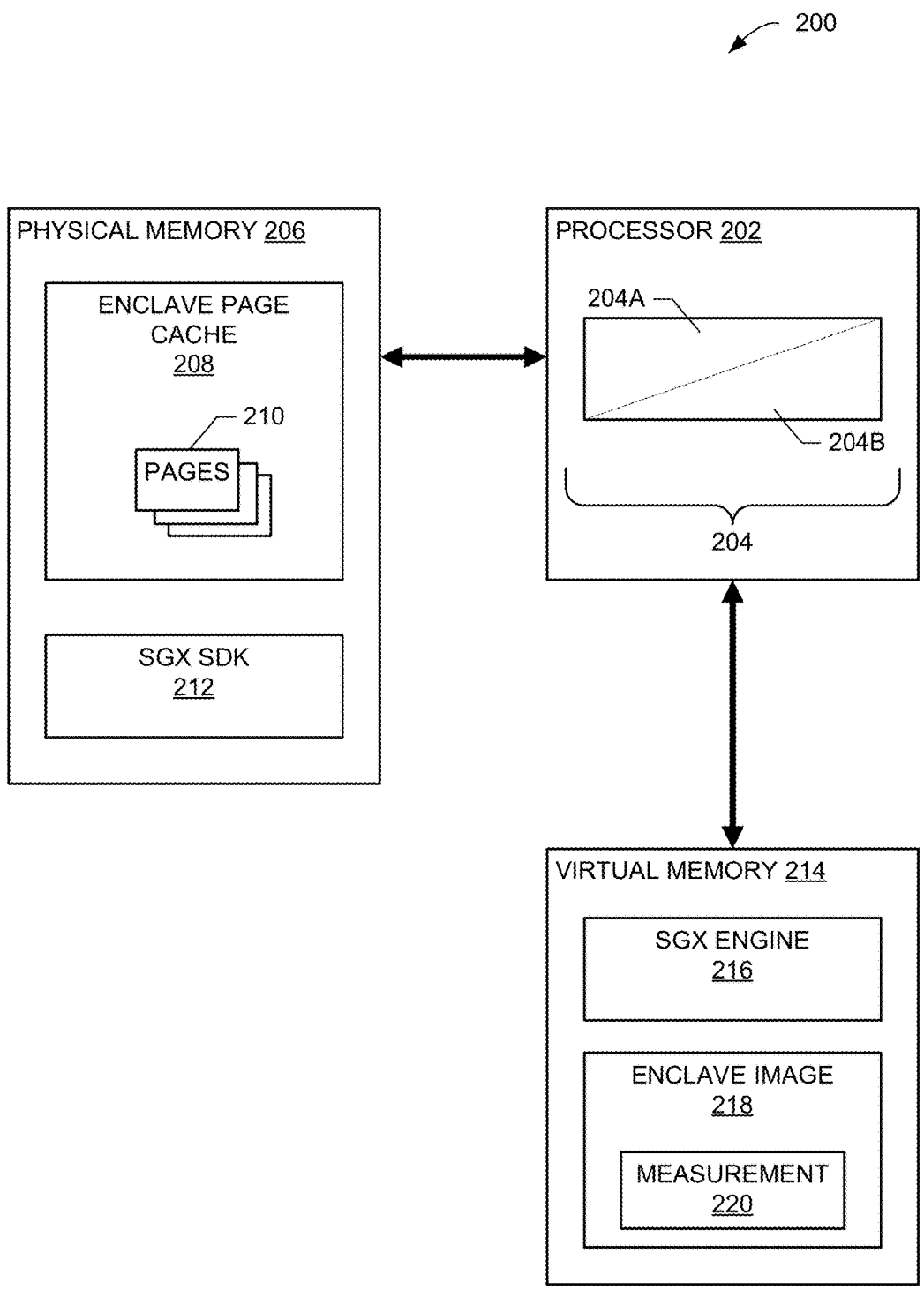
FIG. 2 is an example platform environment to initialize enclaves on target processors.

FIG. 2 illustrates an example platform environment 200 to initialize enclave files on target processors. In the illustrated example of FIG. 2, the platform environment 200 includes a processor 202 containing a software guard extension (SGX) instruction set 204. In some examples, the example processor 202 is referred to as an SGX processor by virtue of a type of SGX instruction set 204. The example SGX instruction set 204 may be a static component instruction set 204A (e.g., a legacy or early generation instruction set), or a dynamic component instruction set 204B (e.g., a more recent generation instruction set that is capable of adding and/or removing dynamic components from the enclave without altering its measurement). The example SGX instruction set 204 includes hardware instructions (e.g., processor microcode) used by an operating system of the platform environment 200 to implement an enclave file for an executable application. The example platform environment 200 also includes physical memory 206 (e.g., a cache memory, dynamic random access memory (DRAM), synchronous DRAM and/or other volatile memory) that may store data and/or instructions for the example platform environment 200. The example physical memory 206 includes an example enclave page cache (EPC) 208 that may include any number of pages 210.

The example EPC 208 is a secure memory structure that can be accessed using instructions from the example SGX instruction set 204. In the illustrated example of FIG. 2, the EPC 208 provides access control mechanisms to protect the integrity and confidentiality of the one or more pages 210. In some examples, the EPC 208 maintains a coherency protocol and may be implemented as a dedicated synchronous RAM of the example processor 202. In some examples, the EPC 208 is implemented via a Crypto Memory Aperture (CMA) mechanism.

The example physical memory 206 also includes an example SGX software development kit (SDK) image file 212 that is loaded on a virtual memory 214 as an SGX engine 216 by the example processor 202. Additionally, the example virtual memory 214 includes an enclave image 218 that is loaded and instantiated by the example SGX engine 216. The example enclave image 218 also includes an associated measurement value 220 that is determined after the enclave image 218 is loaded into virtual memory, but prior to runtime.

In operation, the example enclave image 218 may execute during runtime to perform one or more operations based on a request. For example, a banking client may invoke a function call to determine a measurement value of the enclave image 218 so that it may be compared against a prior known value that is deemed valid and/or otherwise trustworthy. In the event the measurement value stored by the example banking client matches the example measurement value 220 associated with the example enclave image 218, then one or more authorized function calls may be made to the enclave image 218. However, no function calls are available to cause the enclave image 218 to reveal its data and/or code in plaintext format, even if such requests originate from an OS kernel. As such, enclave images 218 implemented by SGX processors 202 are deemed trustworthy containers within which code may be executed.

However, ISVs that develop enclave files to be loaded as enclave images 218 in virtual memory 214 typically tailor their building, compiling and/or linking of the enclave files in a manner that satisfies a target processor type (e.g., a type of SGX instruction set available on the example platform environment 200). As described above in connection with FIGS. 1A and 1B, enclave memory layouts will differ based on a target processor type that allocates virtual memory resources in a manner that causes measurements for the same enclave image file to be different from one platform environment to another platform environment. Additionally, once an enclave image 218 is loaded, it must be instantiated and/or otherwise initialized for runtime with information that reveals which type of memory management instruction set is available. For example, if the example platform environment 200 includes a legacy and/or older generation SGX instruction set that is not capable of dynamic memory management during runtime (e.g., a static SGX processor), then the enclave image 218 must use only those memory management instructions related to static memory management. On the other hand, in the event the example platform environment 200 includes a more-recent generation SGX instruction set that is capable of dynamic memory management during runtime (e.g., a dynamic SGX processor), then the enclave image should use such dynamic memory management instructions to take advantage of performance and/or memory management enhancements (e.g., EPC minimization and/or footprint reduction).

Figure 3:
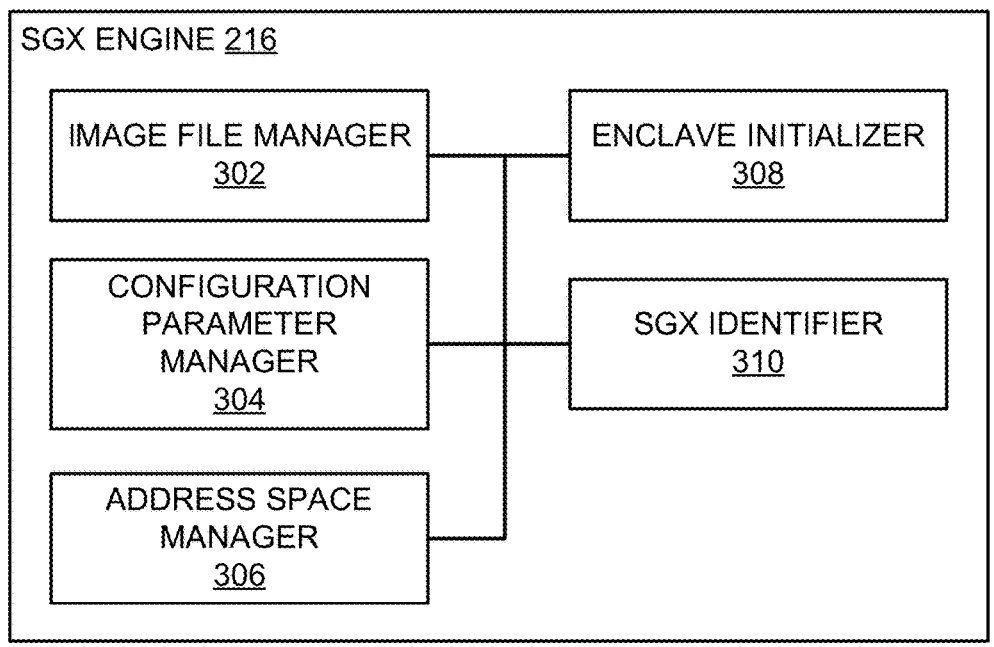
FIG. 3 is an example software guard extension software development kit engine to initialize enclaves on target processors in a manner consistent with this disclosure.

FIG. 3 includes additional detail of the example SGX engine 216 of FIG. 2. In the illustrated example of FIG. 3, the SGX engine 216 includes an image file manager 302, a configuration parameter manager 304, an address space manager 306, an enclave initializer 308, and an SGX identifier 310. In operation (during build-time), the example image file manager 302 retrieves an enclave image file (e.g., from an ISV). In some examples, enclave image files are stored on disk and transferred to a relatively faster storage device, such as the example physical memory 206 of FIG. 2. Ultimately, the target/desired enclave image file is loaded (during load-time) into virtual memory 214 in a particular layout for runtime execution (e.g., see FIGS. 1A and 1B), which includes any number of additional components needed for such execution (e.g., heaps, stacks, threads, etc.). During the example build-time phase, the example configuration parameter manager 304 extracts configuration parameters from the enclave image file. Configuration parameters include, but are not limited to a number of static threads required for runtime, a size of a static heap during runtime, a size of a dynamic heap during runtime, a number of thread stacks and their associated sizes, etc.

Based on the configuration parameters extracted by the example configuration parameter manager 304, the example address space manager 306 calculates (e.g., during the build-time phase when compiling/linking) a virtual address space value. In some examples, the configuration parameter manager 304 calculates a maximum possible address space value that is based on a maximum amount of resources that could be requested and/or otherwise demanded by the enclave image 218 during execution. Determining the maximum possible address space value may be accomplished in a manner consistent with U.S. Patent Publication No. 2014-0006711 A1, filed on Jun. 27, 2012, entitled "Method, System, and Device for Modifying a Secure Enclave Configuration Without Changing the Enclave Measurement," which is incorporated by reference herein in its entirety. The maximum possible address space value specifies, for example, a maximum number of threads supported by an application of the enclave image 218 under any circumstances, which may also include a maximum number of thread control structures, a maximum or upper bound of the heap and/or stack sizes, etc. However, in some examples determining a maximum address space value may accommodate an enclave image that operates in connection with a first type of SGX instruction set, but may not accommodate that enclave image that operates in connection with a second type of SGX instruction set.

Returning to the illustrated example of FIG. 1A, the example first enclave memory layout 100, which is associated with an SGX instruction set capable of handling only static components, has an associated first virtual size 110. For the sake of example, the first virtual size 110 is determined to be a maximum address space value to accommodate the associated enclave image 102 and all components (e.g., two threads) that it might require during operation. On the other hand, in the event the enclave image 102 is to execute in connection with an SGX instruction set capable of handling dynamic components, as shown in the illustrated example of FIG. 1B, then any maximum address space value determination performed earlier in connection with the alternate SGX processor (e.g., the SGX processor capable of only handling static components) would not be appropriate and/or otherwise successful on that alternate target processor. Instead, the example second virtual size 138 of FIG. 1B would be required for successful operation of the enclave image 102 with the dynamic instruction set.

To determine a virtual address size for an enclave of interest that can execute in connection with either the example static component instruction set 204A or the example dynamic component instruction set 204B (while maintaining a measurement value that is consistent in either situation), the example address space manager 306 calculates a minimum address space required for a target application that is to use the example enclave image 102. In particular, because both static memory layouts (e.g., the example first enclave memory layout 100) and dynamic memory layouts (e.g., the example second enclave memory layout 130) must, at a minimum, include all static components during a loading phase, the example address space manager 306 determines a virtual address space that includes the example enclave image 102, the example static heap 104, the example first static thread 106, and the example second static thread 108. To generate an enclave memory layout that is compatible with both types of SGX processors, and to prevent any ISV efforts and/or concerns regarding generating an enclave memory layout that conforms to a particular measurement value, the example address space manager 306 applies a virtual address multiplication factor when determining a virtual address size value. The virtual address multiplication factor may be any numeric value that results in an increase of a minimum address space value to an adjusted value.

Figure 4:
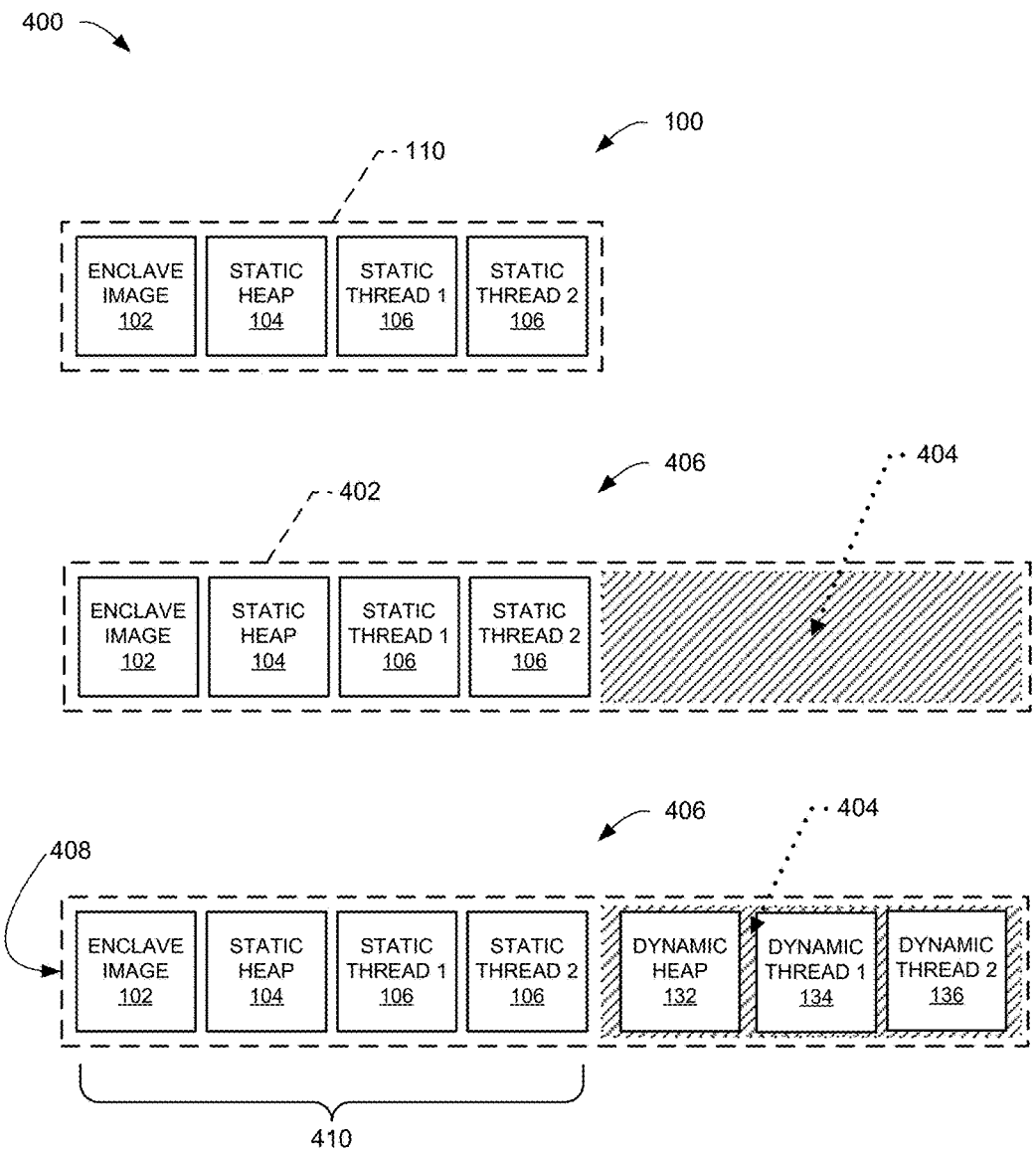
FIG. 4 illustrates example enclave memory layouts generated by the example platform environment of FIG. 2 and the example software guard extension software development kit engine of FIG. 3.

FIG. 4 illustrates example enclave memory layouts 400. In the illustrated example of FIG. 4, the example first enclave memory layout 100 from FIG. 1A is shown for comparison purposes. The example address space manager 306 determines that a minimum virtual address space that is represented by the example first virtual size 110 (see dashed line) under the assumption that both the example first static thread 106 and the example second static thread 108 will be required when the enclave is invoked by an application. While the example first virtual size 110 of FIG. 4 is shown as a rectangular region, the example first virtual size 110 may also be represented in a numeric manner, such as an amount of memory in bytes. To generate an enclave memory layout that is compatible with any type of SGX processor (e.g., static SGX processors with microcode/instruction sets that can handle static components, dynamic SGX processors with microcode/instruction sets that can handle dynamic components), the example address space manager 306 multiplies the example first virtual size 110 by a multiplication factor to determine an optimized virtual size 402 that includes a dynamic virtual container 404. As such, an optimized memory enclave layout 406 results during the loading phase of the enclave image 102. Additionally, regardless of whether the enclave image 102 is to be loaded in connection with a legacy SGX processor (e.g., only capable of static memory management) or a relatively newer generation of SGX processor (e.g., capable of dynamic memory management), the same optimized memory enclave layout 406 may be used.

For example, the illustrated example of FIG. 4 includes the optimized memory enclave layout 406 that was loaded in connection with a platform using a relatively newer generation of SGX processor (see optimized memory enclave layout 406 referenced by 408). At the time of measurement, the static contents of the optimized memory enclave layout 410 have not changed, and the optimized virtual size 402 has not changed, which results in the same measurement values during the enclave loading phase regardless of the type of SGX processor being used. Additionally, in the event the target platform is using the relatively newer generation of SGX processor (e.g., a processor using the example dynamic component instruction set 204B of FIG. 2), then one or more dynamic runtime components may use the example dynamic virtual container 404.

In other words, when the ISV prepares to build, load and instantiate an enclave file for use on a platform (e.g., for which the ISV does not know or care about the particular SGX instruction set capabilities), examples disclosed herein permit such building, loading and instatiation to occur so that the instantiated enclave can operate with either an SGX instruction set that includes static capabilities only, or dynamic capabilities. Further, any measurement taken of the example layout after the loading phase (when measurements occur) will be the same regardless of the SGX processor type used because, in part, the allocated virtual address size will be the same in all instances.

The example enclave instantiator 308 instantiates the example optimized memory enclave layout 406, and the example SGX identifier 310 informs the optimized memory enclave layout 406 of the type of SGX instructions available to it. In particular, the example SGX identifier 310 detects an architecture type of the processor, such as by way of invoking and/or otherwise querying a CPU_ID command/opcode. In the event the query indicates that the processor is of a legacy type, then the example SGX identifier 310 associates the optimized memory enclave layout 406 with a static memory flag so that when the enclave image invokes one or more memory management instructions, it does so in view of the capabilities of the current platform. On the other hand, in the event the query indicates that the processor is of a relatively newer type that is capable of dynamic memory management, then the example SGX identifier 310 associates the optimized memory enclave layout 406 with a dynamic memory flag.

While an example manner of implementing the platform environment 200 of FIG. 2 is illustrated in FIGS. 1-4, one or more of the elements, processes and/or devices illustrated in FIGS. 1-4 may be combined, divided, re-arranged, omitted, eliminated and/or implemented in any other way. Further, the example image file manager 302, the example configuration parameter manager 304, the example address space manager 306, the example enclave initializer 308, the example SGX identifier 310 and/or, more generally, the example SGX engine 216 of FIGS. 2 and/or 3 may be implemented by hardware, software, firmware and/or any combination of hardware, software and/or firmware. Thus, for example, any of the example image file manager 302, the example configuration parameter manager 304, the example address space manager 306, the example enclave initializer 308, the example SGX identifier 310 and/or, more generally, the example SGX engine 216 of FIGS. 2 and/or 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example image file manager 302, the example configuration parameter manager 304, the example address space manager 306, the example enclave initializer 308, the example SGX identifier 310 and/or, more generally, the example SGX engine 216 of FIGS. 2 and/or 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example platform environment 200 of FIGS. 1-4 may include one or more elements, processes and/or devices in addition to, or instead of, those illustrated in FIGS. 1-4, and/or may include more than one of any or all of the illustrated elements, processes and devices.

Figure 5:
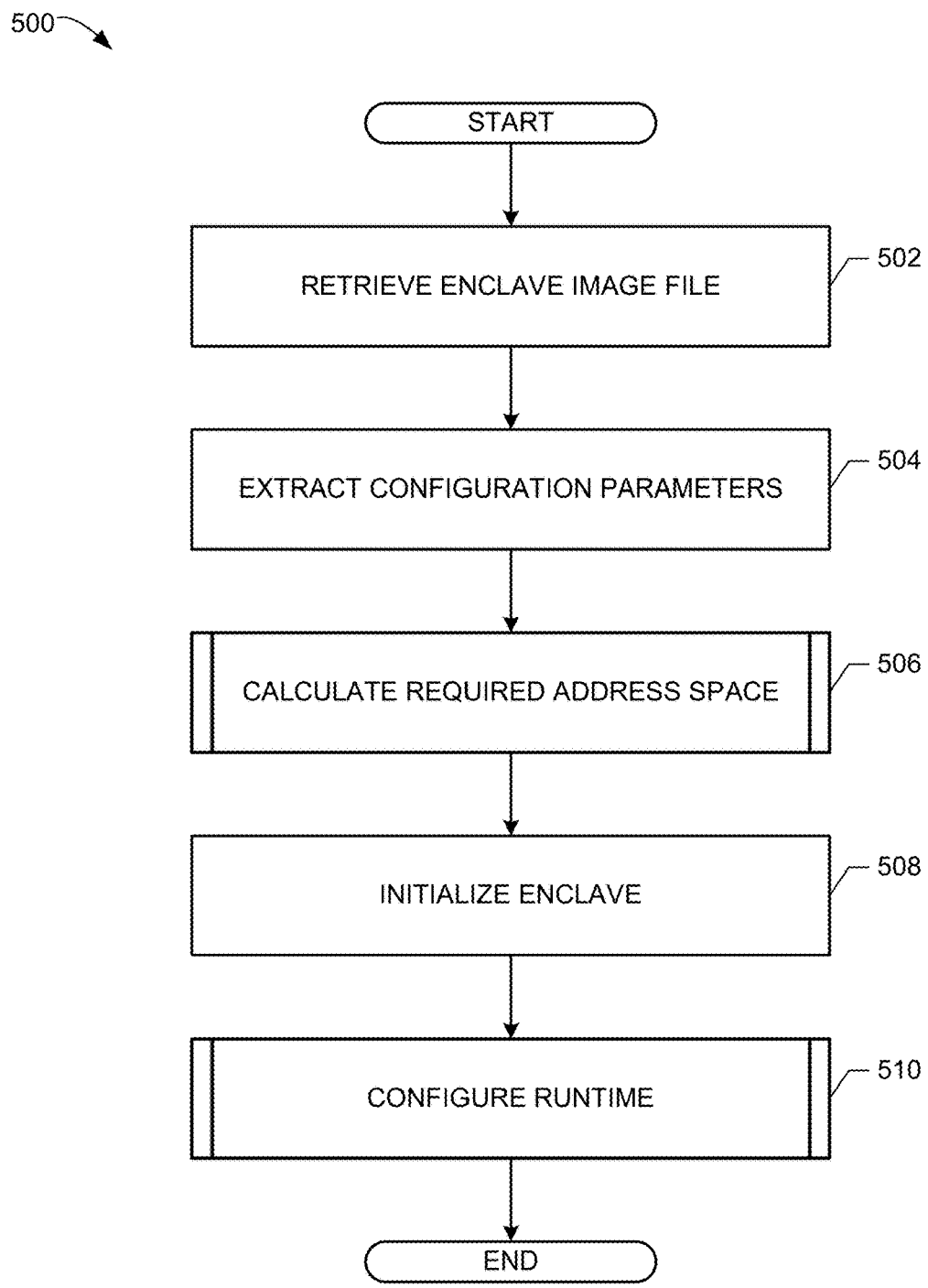
FIGS. 5-7 are flowcharts representative of example machine readable instructions that may be executed to implement the example platform environment of FIG. 2 and the example software guard extension software development kit engine of FIG. 3.
Figure 6:
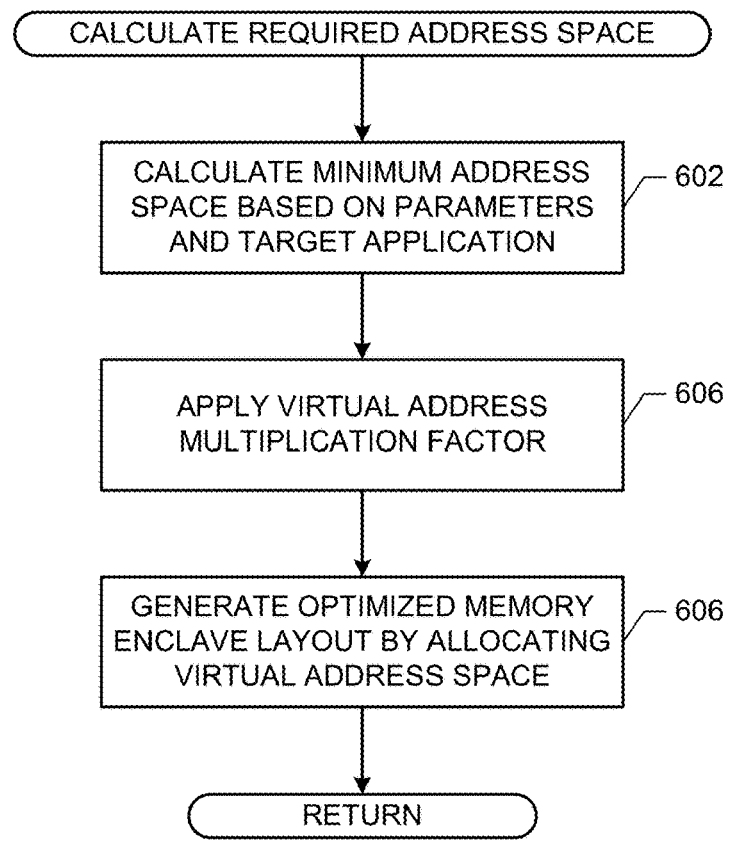
Figure 7:
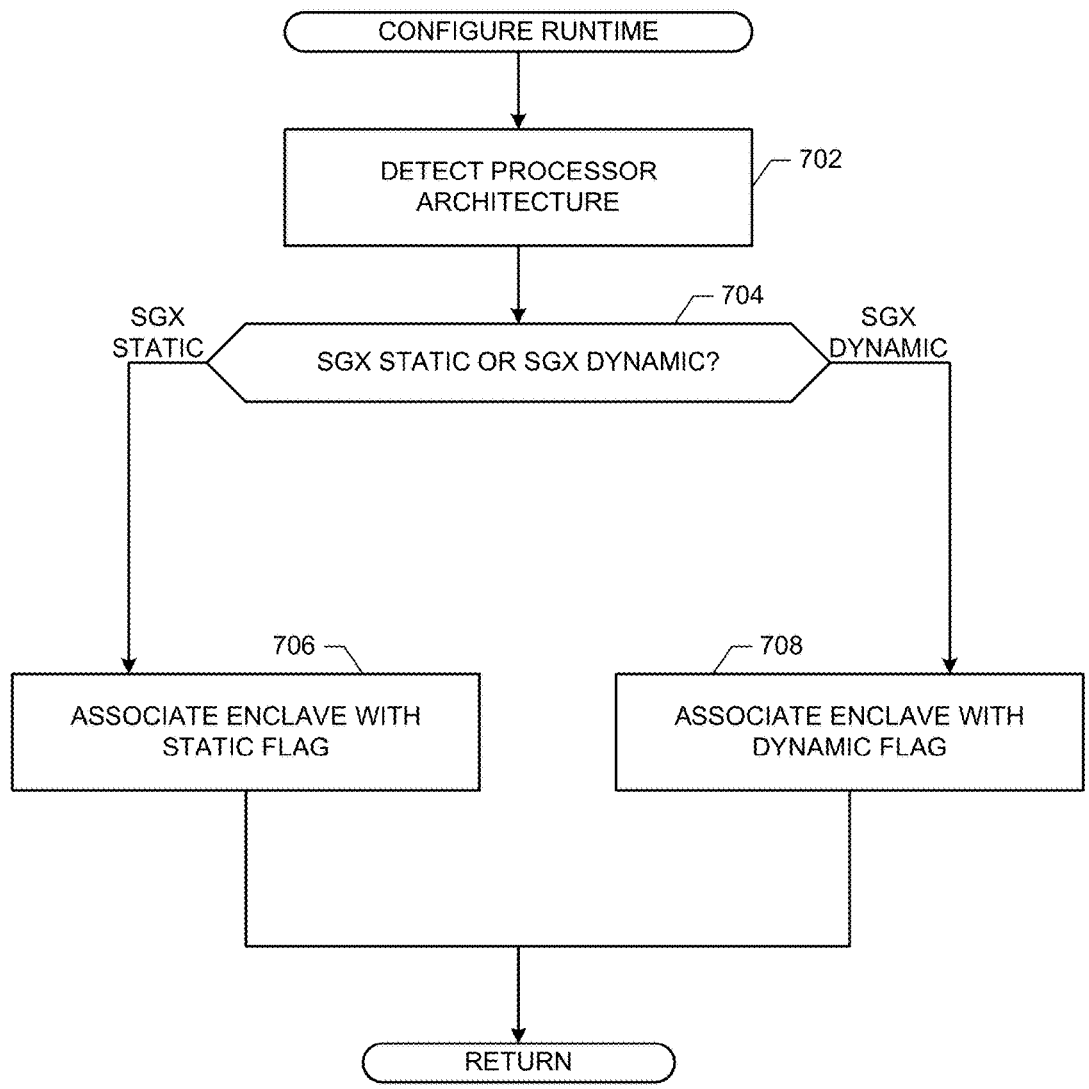

Flowcharts representative of example machine readable instructions for implementing the platform environment 200 of FIGS. 1-4 are shown in FIGS. 5-7. In these examples, the machine readable instructions comprise program(s) for execution by a processor such as the processor 812 shown in the example processor platform 800 discussed below in connection with FIG. 8. The program(s) may be embodied in software stored on a tangible computer readable storage medium such as a CD-ROM, a floppy disk, a hard drive, a digital versatile disk (DVD), a Blu-ray disk, or a memory associated with the processor 812, but the entire program(s) and/or parts thereof could alternatively be executed by a device other than the processor 812 and/or embodied in firmware or dedicated hardware. Further, although the example program(s) is/are described with reference to the flowcharts illustrated in FIGS. 5-7, many other methods of implementing the example platform environment 200 may alternatively be used. For example, the order of execution of the blocks may be changed, and/or some of the blocks described may be changed, eliminated, or combined.

As mentioned above, the example processes of FIGS. 5-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 500 of FIG. 5 begins at block 502 where the example image file manager 302 retrieves an enclave image file, such as an enclave image file developed by an ISV and stored on disk and/or the example physical memory 206. The example configuration parameter manager extracts configuration parameters from the example enclave image file (block 504), which may include information related to a number of static threads required for runtime, a size of a static heap during runtime, a size of a dynamic heap during runtime, a number of thread stacks and/or associated sizes. To generate an enclave memory layout that is compatible with any available processor type, the example address space manager 306 calculates virtual address space (block 506).

FIG. 6 includes additional detail associated with calculating virtual address space of block 506. In the illustrated example of FIG. 6, the example address space manager 306 calculates a minimum address space (block 602). In some examples, the address space manager 306 determines the minimum address space required for runtime based on the retrieved configuration parameters, which identify how many threads the example enclave image is to provide. As described above, the example enclave image may be capable of instantiating any number of threads, but only if such threads are first allocated virtual memory to be used at runtime. To ensure that an enclave image will work on an un-identified target platform having either an SGX processor capable of static memory management only, or capable of dynamic memory management, the example address space manager 306 applies a virtual address multiplication factor to the minimum address space size (block 604). In some examples, the virtual address space size is determined by enclave configuration information (e.g., the metadata), which may include the number of static threads, the number of dynamic threads, sizes of static and/or dynamic heaps, and/or stack sizes. As described above in connection with FIG. 4, the example virtual address multiplication factor results in an additional amount of allocated virtual memory during load time, and shown as the example dynamic virtual container 404. During the enclave loading phase, the example address space manager 306 allocates the newly calculated virtual address space (block 606), such as the optimized virtual size 402 to generate the optimized memory enclave layout 406 shown in FIG. 4.

The example enclave initializer 308 initializes and/or otherwise instantiates the example optimized memory enclave layout (block 508). In some examples, the enclave initializer 308 instantiates the optimized memory enclave layout in a manner consistent with U.S. Patent Publication No. 2014-0006711 A1, filed on Jun. 27, 2012, entitled "Method, System, and Device for Modifying a Secure Enclave Configuration Without Changing the Enclave Measurement," which is incorporated by reference herein in its entirety. Additionally, the example enclave initializer 308 may instantiate the optimized memory enclave layout in a manner consistent with U.S. patent application Ser. No. 14/849,222, filed on Sep. 9, 2015, entitled "Application Execution Enclave Memory Page Cache Management Method and Apparatus," which is incorporated by reference herein in its entirety.

At runtime, the example SGX identifier 310 configures runtime parameters for the example optimized memory enclave layout (block 510). FIG. 7 includes additional detail associated with configuring the runtime parameters for the example optimized memory enclave layout of block 510. In the illustrated example of FIG. 7, the SGX identifier 310 detects a processor architecture type of the processor (block 702). As described above, the example SGX identifier 310 may invoke one or more opcodes/commands to determine and/or otherwise detect the architecture type of the processor, such as the CPU_ID opcode. If the example SGX identifier 310 determines that the processor is of a legacy type (block 704), then the example SGX identifier 310 associates the optimized memory enclave layout 406 with a static memory flag (block 706), thereby allowing static memory management instructions to be used with the optimized memory enclave layout 406. On the other hand, in the event the example SGX identifier 310 determines that the processor is capable of dynamic memory management capabilities (block 704), then the example SGX identifier 310 associates the optimized memory enclave layout 406 with a dynamic memory flag (block 708), thereby allowing dynamic memory management instructions to be used with the optimized memory enclave layout 406.

Figure 8:
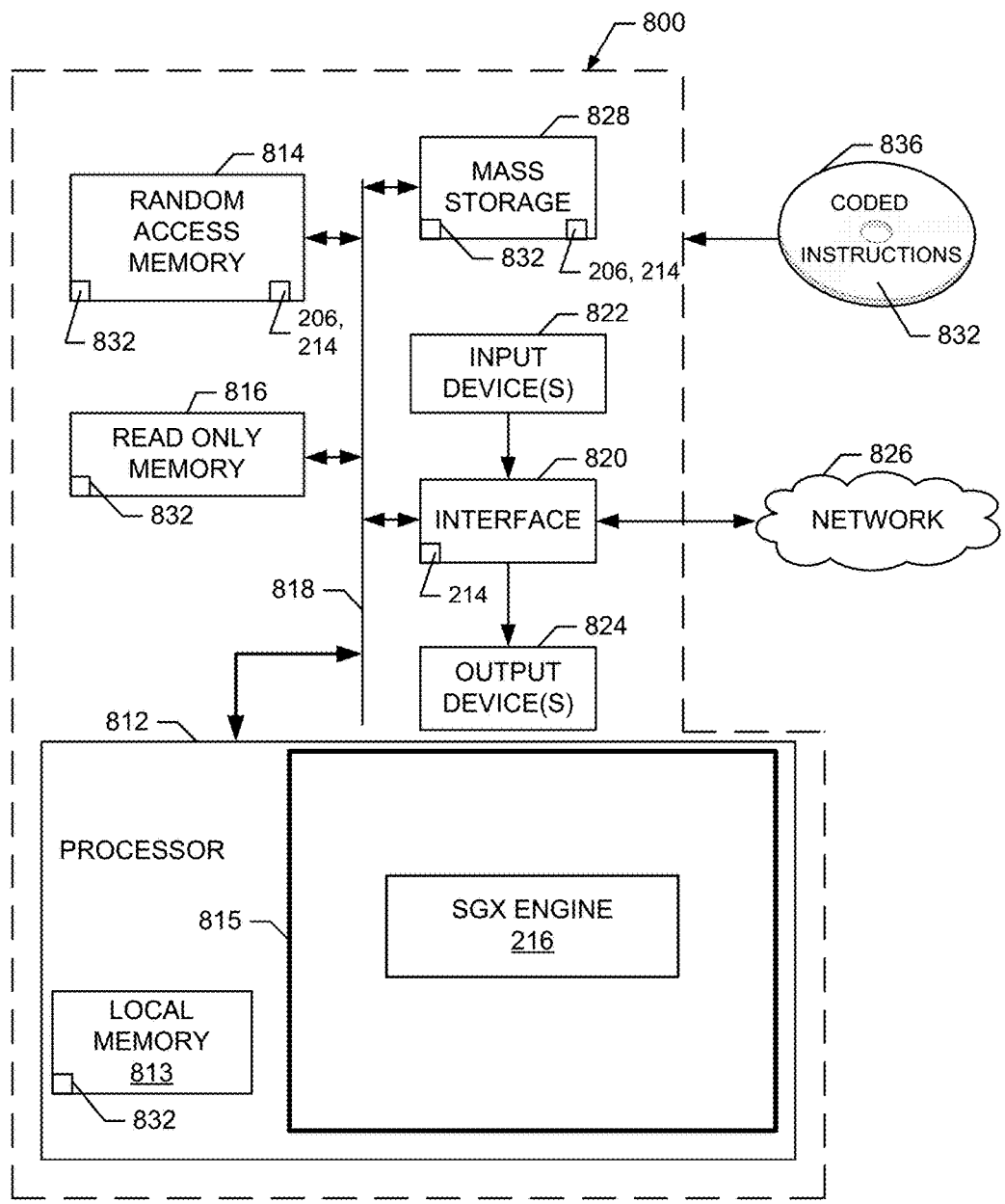
FIG. 8 is a block diagram of an example processor platform structured to execute the example machine readable instructions of FIGS. 5-7 to implement the example platform environment of FIG. 2, the example software guard extension software development kit engine of FIG. 3, and/or the example enclave memory layouts of FIG. 4.

FIG. 8 is a block diagram of an example processor platform 800 capable of executing the instructions of FIGS. 5-7 to implement the SGX engine 216 of FIGS. 1-4. The processor platform 800 can be, for example, a server, a personal computer, an Internet appliance, a gaming console, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. In the illustrated example of FIG. 8, the processor 812 includes one or more example processing cores 815 configured via example instructions 832, which include the example instructions of FIGS. 5-7 to implement the example SGX engine 216 of FIGS. 1-4.

The processor 812 of the illustrated example includes a local memory 813 (e.g., a cache). The processor 812 of the illustrated example is in communication with a main memory including a random access memory (RAM) 814 and a read only memory (ROM) (e.g., non-volatile memory) 816 via a bus 818. The RAM 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The ROM 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL) to facilitate exchange of data within a similar machine platform (e.g., a communication bus), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives. In some examples, the mass storage device 830 may implement the example subscription database 110.

The coded instructions 832 of FIGS. 5-7 may be stored in the mass storage device 828, in the volatile memory 814, in the non-volatile memory 816, and/or on a removable tangible computer readable storage medium such as a CD or DVD 836.

From the foregoing, it will be appreciated that the above disclosed methods, apparatus and articles of manufacture reduce ISV involvement when developing and/or deploying enclave services so that multiple different target processor platforms can implement such enclave services. Accordingly, ISV enclave developers do not need to create and/or otherwise design specific enclaves on a platform-by-platform basis. Additionally, because examples disclosed herein apply a virtual address multiplication factor to the enclave image, the enclave loaded on the platform will exhibit the same measurement regardless of whether the target processor is able to handle static memory management or dynamic memory management during runtime.

Example methods, apparatus, systems and articles of manufacture to initialize enclaves on target processors is disclosed herein. Further examples and combinations thereof include the following.

Example 1 is an apparatus to generate a processor agnostic enclave image layout, including an image file retriever to retrieve configuration parameters associated with an enclave file, and an address space manager to: calculate a minimum virtual address space value for an enclave image layout based on the configuration parameters, and generate an optimized enclave image layout to allow enclave image execution on unknown target processor types by multiplying the minimum address space value with a virtual address factor to determine an optimized virtual address space value for the optimized enclave image layout.

Example 2 includes the apparatus as defined in example 1, wherein the image file retriever is to retrieve a number of candidate threads associated with the enclave file.

Example 3 includes the apparatus as defined in example 2, wherein the configuration parameters include a static heap size associated with the number of candidate threads associated with the enclave file.

Example 4 includes the apparatus as defined in example 3, wherein the address space manager is to calculate the minimum virtual address space value based on the number of candidate threads and the static heap size.

Example 5 includes the apparatus as defined in example 1, wherein the address space manager is to generate the optimized enclave image layout with static enclave components and the optimized virtual address space value prior to an instantiation phase to facilitate a measurement of the optimized enclave image layout.

Example 6 includes the apparatus as defined in example 5, wherein the measurement of the optimized enclave image layout is the same for all of the unknown processor types.

Example 7 includes the apparatus as defined in example 1, further including a software guard extension (SGX) identifier to determine a type of a respective one of the unknown processor types.

Example 8 includes the apparatus as defined in example 7, wherein the type of the respective one of the unknown processor types includes at least one of a static SGX processor or a dynamic SGX processor.

Example 9 includes the apparatus as defined in example 7, wherein the SGX identifier is to associate the optimized enclave image layout with a target enclave instruction set based on the determined type of the respective one of the unknown processor types.

Example 10 includes a method to generate a processor agnostic enclave image layout, including retrieving configuration parameters associated with an enclave file, calculating a minimum virtual address space value for an enclave image layout based on the configuration parameters, and generating an optimized enclave image layout to allow enclave image execution on unknown target processor types by multiplying the minimum address space value with a virtual address factor to determine an optimized virtual address space value for the optimized enclave image layout.

Example 11 includes the method as defined in example 10, further including retrieving a number of candidate threads associated with the enclave file.

Example 12 includes the method as defined in example 11, wherein the configuration parameters include a static heap size associated with the number of candidate threads associated with the enclave file.

Example 13 includes the method as defined in example 12, further including calculating the minimum virtual address space value based on the number of candidate threads and the static heap size.

Example 14 includes the method as defined in example 10, further including generating the optimized enclave image layout with static enclave components and the optimized virtual address space value prior to an instantiation phase to facilitate a measurement of the optimized enclave image layout.

Example 15 includes the method as defined in example 14, wherein the measurement of the optimized enclave image layout is the same for all of the unknown processor types.

Example 16 includes the method as defined in example 10, further including determining a type of a respective one of the unknown processor types.

Example 17 includes the method as defined in example 16, wherein the type of the respective one of the unknown processor types includes at least one of a static SGX processor or a dynamic SGX processor.

Example 18 includes the method as defined in example 16, further including associating the optimized enclave image layout with a target enclave instruction set based on the determined type of the respective one of the unknown processor types.

Example 19 is a tangible computer-readable storage disk or storage device comprising instructions which, when executed, cause a processor to at least: retrieve configuration parameters associated with an enclave file, calculate a minimum virtual address space value for an enclave image layout based on the configuration parameters, and generate an optimized enclave image layout to allow enclave image execution on unknown target processor types by multiplying the minimum address space value with a virtual address factor to determine an optimized virtual address space value for the optimized enclave image layout.

Example 20 includes the tangible computer-readable storage disk or storage device as defined in example 19, wherein the instructions, when executed, further cause the processor to retrieve a number of candidate threads associated with the enclave file.

Example 21 includes the tangible computer-readable storage disk or storage device as defined in example 20, wherein the instructions, when executed, further cause the processor to identify a static heap size associated with the number of candidate threads associated with the enclave file.

Example 22 includes the tangible computer-readable storage disk or storage device as defined in example 21, wherein the instructions, when executed, further cause the processor to calculate the minimum virtual address space value based on the number of candidate threads and the static heap size.

Example 23 includes the tangible computer-readable storage disk or storage device as defined in example 19, wherein the instructions, when executed, further cause the processor to generate the optimized enclave image layout with static enclave components and the optimized virtual address space value prior to an instantiation phase to facilitate a measurement of the optimized enclave image layout.

Example 24 includes the tangible computer-readable storage disk or storage device as defined in example 23, wherein the instructions, when executed, further cause the processor to create the measurement of the optimized enclave image layout as the same for all of the unknown processor types.

Example 25 includes the tangible computer-readable storage disk or storage device as defined in example 19, wherein the instructions, when executed, further cause the processor to determine a type of a respective one of the unknown processor types.

Example 26 includes the tangible computer-readable storage disk or storage device as defined in example 25, wherein the instructions, when executed, further cause the processor to associate the optimized enclave image layout with a target enclave instruction set based on the determined type of the respective one of the unknown processor types.

Example 27 is a system to generate a processor agnostic enclave image layout, comprising means for retrieving configuration parameters associated with an enclave file, means for calculating a minimum virtual address space value for an enclave image layout based on the configuration parameters, and means for generating an optimized enclave image layout to allow enclave image execution on unknown target processor types by multiplying the minimum address space value with a virtual address factor to determine an optimized virtual address space value for the optimized enclave image layout.

Example 28 includes the system as defined in example 27, further including means for retrieving a number of candidate threads associated with the enclave file.

Example 29 includes the system as defined in example 28, wherein the configuration parameters include a static heap size associated with the number of candidate threads associated with the enclave file.

Example 30 includes the system as defined in example 29, further including means for calculating the minimum virtual address space value based on the number of candidate threads and the static heap size.

Example 31 includes the system as defined in example 27, further including means for generating the optimized enclave image layout with static enclave components and the optimized virtual address space value prior to an instantiation phase to facilitate a measurement of the optimized enclave image layout.

Example 32 includes the system as defined in example 31, wherein the measurement of the optimized enclave image layout is the same for all of the unknown processor types.

Example 33 includes the system as defined in example 27, further including means for determining a type of a respective one of the unknown processor types.

Example 34 includes the system as defined in example 33, wherein the type of the respective one of the unknown processor types includes at least one of a static SGX processor or a dynamic SGX processor.

Example 35 includes the system as defined in example 33, further including means for associating the optimized enclave image layout with a target enclave instruction set based on the determined type of the respective one of the unknown processor types.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to generate a processor agnostic enclave image layout, comprising:
   an image file retriever to retrieve configuration parameters associated with an enclave file; and
   an address space manager to:
      calculate a minimum virtual address space value for an enclave image layout based on the configuration parameters; and
      generate an optimized enclave image layout to allow enclave image execution on unknown target processor types by multiplying the minimum address space value with a virtual address factor to determine an optimized virtual address space value for the optimized enclave image layout.

2. An apparatus as defined in claim 1, wherein the address space manager is to generate the optimized enclave image layout with static enclave components and the optimized virtual address space value prior to an instantiation phase to facilitate a measurement of the optimized enclave image layout.

3. An apparatus as defined in claim 1, further including a software guard extension (SGX) identifier to determine a type of a respective one of the unknown processor types.

4. An apparatus as defined in claim 3, wherein the type of the respective one of the unknown processor types includes at least one of a static SGX processor or a dynamic SGX processor.

5. An apparatus as defined in claim 1, wherein the image file retriever is to retrieve a number of candidate threads associated with the enclave file.

6. An apparatus as defined in claim 5, wherein the configuration parameters include a static heap size associated with the number of candidate threads associated with the enclave file.

7. An apparatus as defined in claim 6, wherein the address space manager is to calculate the minimum virtual address space value based on the number of candidate threads and the static heap size.

8. A method to generate a processor agnostic enclave image layout, comprising:
   retrieving configuration parameters associated with an enclave file;
   calculating a minimum virtual address space value for an enclave image layout based on the configuration parameters; and
   generating an optimized enclave image layout to allow enclave image execution on unknown target processor types by multiplying the minimum address space value with a virtual address factor to determine an optimized virtual address space value for the optimized enclave image layout.

9. A method as defined in claim 8, further including determining a type of a respective one of the unknown processor types.

10. A method as defined in claim 8, further including generating the optimized enclave image layout with static enclave components and the optimized virtual address space value prior to an instantiation phase to facilitate a measurement of the optimized enclave image layout.

11. A method as defined in claim 10, wherein the measurement of the optimized enclave image layout is the same for all of the unknown processor types.

12. A method as defined in claim 8, further including retrieving a number of candidate threads associated with the enclave file.

13. A method as defined in claim 12, wherein the configuration parameters include a static heap size associated with the number of candidate threads associated with the enclave file.

14. A method as defined in claim 13, further including calculating the minimum virtual address space value based on the number of candidate threads and the static heap size.

15. At least one tangible computer-readable storage disk or storage device comprising instructions which, when executed, cause a processor to at least:
   retrieve configuration parameters associated with an enclave file;
   calculate a minimum virtual address space value for an enclave image layout based on the configuration parameters; and
   generate an optimized enclave image layout to allow enclave image execution on unknown target processor types by multiplying the minimum address space value with a virtual address factor to determine an optimized virtual address space value for the optimized enclave image layout.

16. A tangible computer-readable storage disk or storage device as defined in claim 15, wherein the instructions, when executed, further cause the processor to retrieve a number of candidate threads associated with the enclave file.

17. A tangible computer-readable storage disk or storage device as defined in claim 15, wherein the instructions, when executed, further cause the processor to generate the optimized enclave image layout with static enclave components and the optimized virtual address space value prior to an instantiation phase to facilitate a measurement of the optimized enclave image layout.

18. A tangible computer-readable storage disk or storage device as defined in claim 17, wherein the instructions, when executed, further cause the processor to create the measurement of the optimized enclave image layout as the same for all of the unknown processor types.

19. A tangible computer-readable storage disk or storage device as defined in claim 15, wherein the instructions, when executed, further cause the processor to determine a type of a respective one of the unknown processor types.

20. A tangible computer-readable storage disk or storage device as defined in claim 19, wherein the instructions, when executed, further cause the processor to associate the optimized enclave image layout with a target enclave instruction set based on the determined type of the respective one of the unknown processor types.

\* \* \* \* \*